Jan. 2, 1962   A. J. WESOLOWSKI   3,015,744
ROTOR LEADS
Filed Aug. 19, 1959
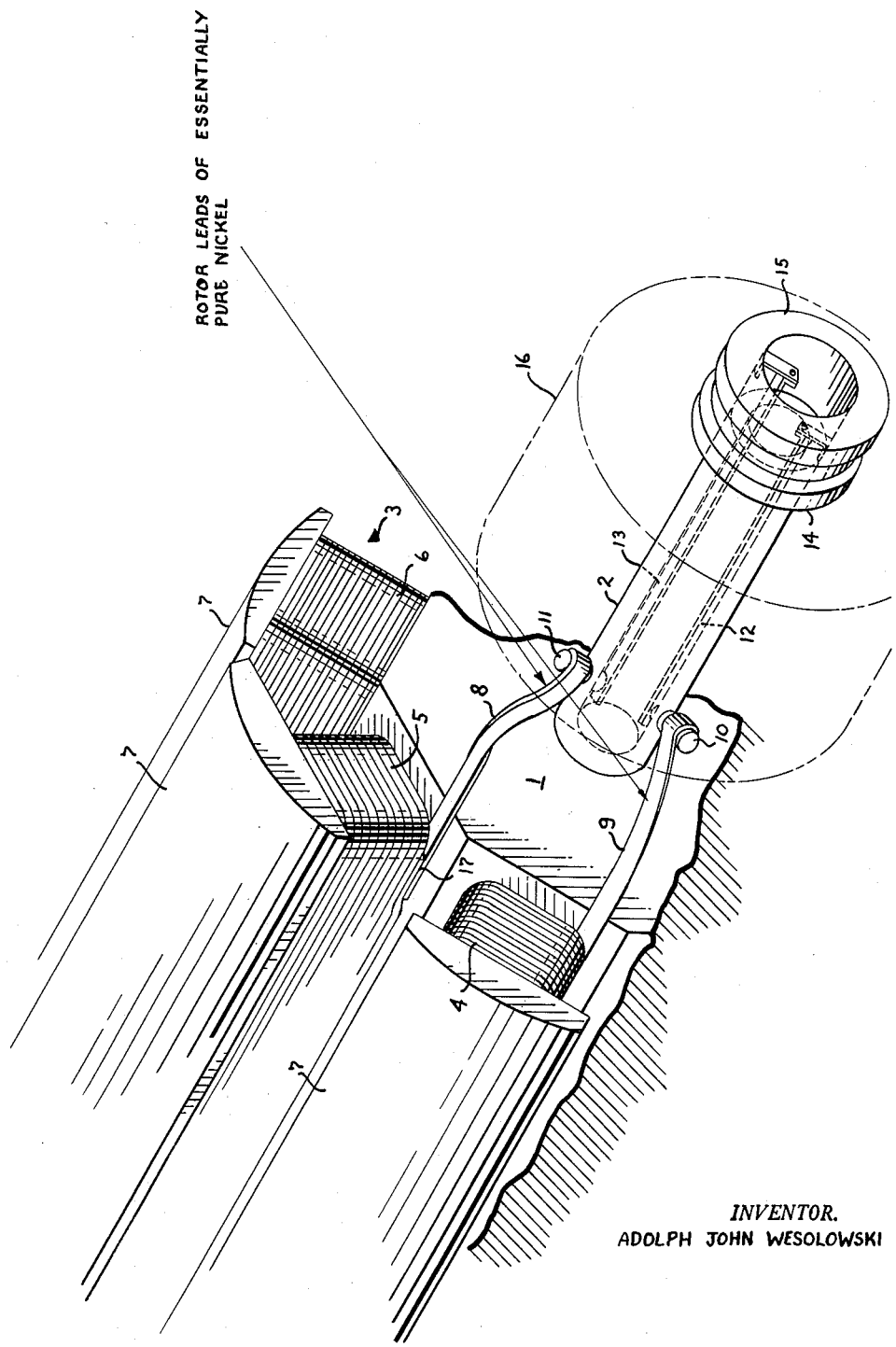
INVENTOR.
ADOLPH JOHN WESOLOWSKI United States Patent Office 3,015,744
Patented Jan. 2, 1962

3,015,744
ROTOR LEADS
Adolph J. Wesolowski, Scottsdale, Ariz., assignor to General Electric Company, a corporation of New York
Filed Aug. 19, 1959, Ser. No. 834,867
4 Claims. (Cl. 310—234)

This invention relates to rotor lead connections for dynamoelectric machines, and more particularly to such connections in a dynamoelectric machine subjected to adverse operating conditions.

Dynamoelectric machines used on aircraft to supply electrical power for the aircraft accessories are subjected to a variety of adverse operating conditions, and must meet specification requirements not encountered in normal dynamoelectric machine usage. For example, dynamoelectric machines designed for use on aircraft must be compact in size and light in weight, since both space and weight are premium considerations in aircraft. Therefore, a relatively large output is desired from a relatively small dynamoelectric machine. To achieve a large output from a small machine, it is necessary to drive the machine very hard. For example, one three-phase alternating current aircraft generator is driven at 6,000 r.p.m. to yield an output of approximately 60 kilovolt-amperes (kva.) at 120/208 volts. Additionally, the mechanical structure of the machine and its parts must be sufficient to withstand continuous vibration due to the prime mover of the aircraft, which is often of the piston type.

In normal installations of dynamoelectric machines, where size and weight of the machines are not critical as in aircraft machines, the connections from rotor windings to current collector terminal posts on the shaft may merely be extensions of the rotor coils, or may be copper conductors brazed or otherwise connected between the end of a coil and spanning the distance to a terminal post. Inasmuch as generators used in ground installations are not usually subjected to excessively high operating speeds, nor are they driven at extremely high rated speeds to derive a large output in relation to machine weight and size, the brazing of copper connectors between rotor coils and a terminal post on the shaft is acceptable practice. From an economic and manufacturing viewpoint, it is desirable to braze the rotor connecting leads to the rotor coils at one end of the leads, and to braze the other end of the rotor connecting lead to a terminal post or other connection point on the shaft, having the lead span the distance between the rotor coil and the terminal post.

In aircraft installations where the speed of the rotor may be 6,000 r.p.m. and higher, the centrifugal force on the rotor leads, which increases with the square of the angular velocity, presents a serious problem in that copper, being a soft metal of relatively low tensile strength when unsupported, tends to elongate under stress. This elongation is also known as "creep." As the copper strips elongate due to the centrifugal force, a point is eventually reached where the strips will rupture, thereby causing loss of generator services. Additionally, the rotor leads are subjected to flexing and vibration due to air resistance at high rotational speeds. In view of the high current-carrying capacity of copper, it is desirable to use copper for the rotor lead connections; however, the low tensile strength of copper makes its use as rotor lead connections in high speed machines unsatisfactory, where the lead is unsupported between connection points.

Another problem presented by the use of copper rotor leads is hydrogen embrittlement. At temperatures above 180° centigrade, copper oxidizes in dry air, and when heated to a molten state, copper readily absorbs hydrogen, among other gases. When copper pieces are joined in a normal atmosphere either by torch braze or by resistance braze, the copper absorbs hydrogen from the atmosphere and/or the gas used in torch brazing. The absorbed hydrogen works into the grain boundaries of the copper to form a crystalline structure which hardens the copper, resulting in localized brittle areas. On aircraft propelled by piston engines, the great amount of vibration present eventually causes fracture in and rupture of the brittle areas of the rotor leads which leads to loss of service of the generator.

Many attempts have been made to find a suitable rotor lead connection for high speed generators which was not subject to "creep" at high speeds, nor subject to hydrogen embrittlement introduced by the heat of brazing. An apparently obvious solution would be the use of a high tensile strength, high-current capacity copper alloy. Various copper alloys which have been tested have had sufficient tensile strength to withstand the centrifugal forces to which they were subjected and the flexing due to air resistance, but the copper alloys were also subject to hydrogen embrittlement and resulting fracture due to vibration.

It is highly desirable to use copper or a suitable copper alloy for the rotor lead connections, but due to the inadequacy of copper or copper alloy strips, various rotor lead arrangements, including braided copper connectors and specially designed channeled clips to receive a copper connector strip in the channel for attachment to a terminal post on the shaft have been used, but these arrangements did not prove satisfactory due to either one or both of the aforementioned difficulties.

The use of aluminum, a good electrical conductor for rotor leads, would not be feasible due to the low tensile strength of aluminum, and also due to the fact that a good bond between an aluminum strip and a copper coil can not be obtained except by the use of clamps. Furthermore, solder connections are not feasible due to high operating temperatures which would weaken a solder bond.

In view of the aforementioned limitations and problems presented by the use of conventional rotor lead connections and connection arrangements, it is a primary object of my invention to provide a satisfactory rotor lead connection for high speed dynamoelectric machines which will withstand the application of large centrifugal and flexing forces, and which will not rupture when subjected to continuous vibration.

It is a further object of my invention to provide a simple rotor lead construction for high speed dynamoelectric machines subject to continuous vibration that is inexpensive and may be rapidly made.

In achieving the objects of my invention, I use essentially pure nickel, a metal of relatively low electrical conductivity with respect to copper, to connect the rotor coils to the accumulator rings. The nickel stock from which the rotor leads are made should preferably be at least 99.8% pure nickel. Nickel of this purity is generally referred to as commercially pure nickel. The essentially pure nickel strip is brazed at one end to the end of a copper rotor coil and the second end of the strip is brazed either to a terminal post on the shaft or may be connected directly to an accumulator ring.

The novel features of the invention are set forth with particularity in the appended claims. The invention itself, however, may best be understood by reference to the following description taken in connection with the single drawing which is a perspective view of a portion of a dynamoelectric machine incorporating the invention.

Referring now to the drawing, a portion of a separately excited alternating current generator having a salient pole rotating field structure is shown. The generator comprises a rotor 1 mounted on a hollow rotating shaft 2, with salient poles 3 having edge-wound copper field coils 4, 5 and 6 thereon, which are compressively secured between pole pieces 7 and a surface of the rotor. Essentially pure nickel conductor strips 8 and 9 connect one of the ends of each of field coils 4 and 5 to terminal posts 10 and 11 inserted in hollow shaft 2 and secured therein, preferably by mating threads, not shown, suitably insulated from the shaft 2. Terminal posts 10 and 11 are connected through conductors 12 and 13 within the hollow shaft to accumulator rings 14 and 15 respectively, mounted on shaft 2 and suitably insulated from the shaft 2. Also mounted on shaft 2 is an exciter 16, shown in phantom outline. The electrical connections of the generator, other than the rotor leads 8 and 9, do not form part of my invention and therefore are not illustrated. The electrical connections, of course, between accumulator rings 14 and 15, and exciter 16 may be made in a usual manner well-known to those skilled in the art.

In accordance with my invention, I connect the field coils 4 and 5, which are edge-wound copper strips, to terminal posts 10 and 11, and hence to accumulator rings 14 and 15 through essentially pure nickel strip conductors 8 and 9 which are supported only at the points of connection to the field coils and the terminal posts. I have found that essentially pure nickel may be brazed to copper without affecting the metallurgy of the nickel in any manner which would cause embrittlement of the nickel that would lead to fracture and rupture when exposed to continuous vibration. Furthermore, the nickel strips 8 and 9 have sufficient tensile strength that they will not rupture when subject to large centrifugal forces, nor will they rupture due to flexing and vibration induced by air resistance caused by high rotational speeds.

In accomplishing the connections between the field coils and the terminal posts in the illustrated embodiment of my invention, an essentially pure nickel conductor 8 is brazed to an end 17 of a coil of edge-wound copper 5. One end of lead 8 and the portion 17 of the field coil 5 are then wrapped with insulating material, which for clarity of illustration of the connection is not shown. When the field coil 5 is placed about the salient pole which is secured to the rotor, the brazed joint between the portion 17 of the copper coil and the essentially pure nickel strip 8 is placed in compression beneath the bottom of the coil 5 and a surface of the rotor. This arrangement is utilized because even though the nickel strip does not become embrittled due to the brazing operation, the portion 17 of the copper field coil and localized area adjacent to the area of brazing will absorb hydrogen and become embrittled, and the manner in which the brazed area is secured between the coil 5 and the rotor 1 prevents rupture due to continuous vibration.

To complete the rotor lead connection, lead 8 is preferably pulled taut and the second end of lead 8 is wrapped about terminal post 11 and brazed thereto. The terminal post is preferably a suitable brass or bronze stud threaded to allow suitable anchoring into the hollow shaft and insulating therefrom. Conductor strip 9 is connected between coil 4 and terminal post 10 in the same manner.

It is to be understood that in machines which do not have an exciter mounted on the shaft, the nickel leads may be directly connected to the accumulator rings and considered a part of the collector assembly unit. This structure is possible inasmuch as the shaft, without an exciter, is considerably reduced in length. At the point where the nickel strips 8 and 9 are connected to terminal posts 10 and 11, they would be properly insulated and secured to the shaft by binding wire.

The essentially pure nickel connector strips have a tensile strength sufficient to withstand the large centrifugal forces exerted thereon, due to the high speed of rotation of shaft 2. These essentially pure nickel connector strips do not become embrittled due to brazing, and therefore withstand the continuous vibration to which they are subjected. Of course the cross-sectional area of a nickel strip must be larger than if a copper strip was used. However, the ratio of the cross-sectional area of a nickel strip to a copper strip designed for use in the same dynamoelectric machine is not directly related by the electrical conductivities of the two metals. I have found that where previously a copper rotor connector strip .020 inch in thickness and .225 inch in width was utilized, a nickel strip .040 inch in thickness and .312 inch in width will furnish sufficient current conductivity. This was rather unexpected, inasmuch as the ratio of cross-sectional areas of nickel to copper is approximately 2.8, while the ratio of conductivity of copper to nickel is approximately 6.3.

In using the essentially pure nickel rotor leads, it is important that nickel as pure as is economicaly feasible be used, inasmuch as the resistance of nickel greatly increases with an increasing percentage of impurities. Because of this, I prefer to use what is known at this time as commercially pure, grade A nickel. At the time of my invention, nickel so designated might be expected to be 99.9% pure.

In providing rotor connector leads of commercially pure nickel, I have furnished a rotor lead connector unsupported between points of connection which not only withstands the high centrifugal forces resulting from high speeds of rotation of the rotating member of a dynamoelectric machine, but solves the problem presented by the rupture of heretofore used copper leads due to hydrogen embrittlement introduced by brazing. Furthermore, the construction of the rotor connection is simple, inexpensive and rapidly made, using a minimum of material and labor. The term "high speed" used in describing my invention refers to those speeds of operation at which unsupported copper conductors, of sufficient cross-section to carry a desired current, elongate due to centrifugal force and flexing due to air resistance with resulting rupture.

While my invention was made in view of the difficulties and problems presented in high speed alternating current generators designed for use on aircraft where they are subject to continuous vibration, it is apparent that my solution to the problems encountered there would be applicable to other installations of dynamoelectric machines which are operated at extremely high speed and which are subject to continuous vibration. Accordingly, it is my intention to cover all changes and modifications of the examples of the invention herein disclosed, which do not constitute departures from the spirit and scope of the invention.

What I claim as new and desire to secure by Letters Patent of the United States is:

1. A dynamoelectric machine comprising a shaft having salient pole pieces mounted thereon with coils formed of copper thereabout and a current collector mounted on said shaft at one end thereof, means for providing an electrical connection between said current collector and an end of one of said coils adjacent said current collector comprising a rectangular cross section strip of essentially pure nickel brazed at one end thereof to said end of one of coils and brazed at the other end thereof to means on said shaft in electrical contact with said current collector, said nickel strip being unsupported between points of connection.

2. The apparatus of claim 1 wherein the brazed coil-strip connection is secured beneath said one coil and said rotor.

3. In a dynamoelectric machine comprising a shaft having a rotor thereon of greater diameter than said shaft, said rotor having salient poles thereon with coils formed of copper thereabout, a current collector mounted on one end of said shaft, means providing an electrical connection between said current collector and an end of one of said coils adjacent said current collector comprising a strip of essentially pure nickel brazed at one end thereof to said end of said coil and mechanically secured on said shaft prior to electrical connection to said current collector, said nickel strip being unsupported between said point of connection and said place of securing.

4. The apparatus of claim 3 wherein the brazed coil-strip connection is secured beneath said one coil and said rotor.

References Cited in the file of this patent

UNITED STATES PATENTS

| | | | |
|---|---|---|---|
| 680,265 | Moody | Aug. 13, | 1901 |
| 1,695,859 | Richter | Dec. 18, | 1928 |
| 1,946,957 | Allen | Feb. 13, | 1934 |
| 2,298,862 | Balz et al. | Oct. 13, | 1942 |
| 2,866,955 | Mees et al. | Dec. 30, | 1958 |